(12) United States Patent
Resch et al.

(10) Patent No.: US 10,331,519 B2
(45) Date of Patent: Jun. 25, 2019

(54) APPLICATION OF SECRET SHARING SCHEMES AT MULTIPLE LEVELS OF A DISPERSED STORAGE NETWORK

(71) Applicant: International Business Machines Corporation, Armonk, NY (US)

(72) Inventors: Jason K. Resch, Chicago, IL (US); Ahmad Alnafoosi, Streamwood, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/804,090

(22) Filed: Nov. 6, 2017

(65) Prior Publication Data

US 2018/0074889 A1 Mar. 15, 2018

Related U.S. Application Data

(63) Continuation-in-part of application No. 15/427,934, filed on Feb. 8, 2017, now Pat. No. 9,813,501, which
(Continued)

(51) Int. Cl.
*G06F 15/16* (2006.01)
*G06F 11/10* (2006.01)
(Continued)

(52) U.S. Cl.
CPC ............ *G06F 11/108* (2013.01); *G06F 3/064* (2013.01); *G06F 3/067* (2013.01); *G06F 3/0619* (2013.01);
(Continued)

(58) Field of Classification Search
CPC .......... G06F 17/30091; G06F 21/6227; G06F 21/6218; G06F 3/067; H04L 63/06; H04L 9/0618; H04W 12/04
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Kyung H Shin
(74) *Attorney, Agent, or Firm* — Garlick & Markison; Timothy W. Markison; H. Shannon Tyson, Jr.

(57) ABSTRACT

Methods for use in a dispersed storage network (DSN) to encode data using threshold based secret sharing schemes. In one embodiment, a computing device uses a first threshold based secret sharing scheme in accordance with first secret sharing parameters to encode a data segment of a data file to produce a set of encoded data shares. The computing device then sends the set of encoded data shares to a set of storage units, including sending an encoded data share to a first storage unit of the set of storage units. Upon receiving the encoded data share, the first storage unit encodes the encoded data share using a second threshold based secret sharing scheme in accordance with second secret sharing parameters to produce a set of encoded data sub-shares. The first storage unit then stores the set of encoded data sub-shares in a set of memory devices of the storage unit.

20 Claims, 12 Drawing Sheets

Related U.S. Application Data is a continuation of application No. 13/959,006, filed on Aug. 5, 2013, now Pat. No. 9,648,087.

(60) Provisional application No. 61/711,106, filed on Oct. 8, 2012.

(51) Int. Cl.

| | |
|---|---|
| *G06F 21/64* | (2013.01) |
| *H04L 29/08* | (2006.01) |
| *H04L 12/911* | (2013.01) |
| *G06F 9/50* | (2006.01) |
| *H04L 12/26* | (2006.01) |
| *G06F 3/06* | (2006.01) |
| *G06F 21/62* | (2013.01) |
| *H04L 9/08* | (2006.01) |

(52) U.S. Cl.
CPC ........ *G06F 9/5027* (2013.01); *G06F 11/1076* (2013.01); *G06F 21/6218* (2013.01); *G06F 21/64* (2013.01); *H04L 9/085* (2013.01); *H04L 9/0894* (2013.01); *H04L 43/0852* (2013.01); *H04L 47/70* (2013.01); *H04L 67/10* (2013.01); *H04L 67/1097* (2013.01); *H04L 67/32* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0088976 A1 | 4/2005 | Chafle et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0268966 A1* | 10/2010 | Leggette ............. G06F 21/6227 713/193 |
| 2011/0126295 A1 | 5/2011 | Resch |
| 2011/0314346 A1* | 12/2011 | Vas .................... H04L 63/06 714/49 |
| 2013/0179894 A1 | 7/2013 | Calder et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

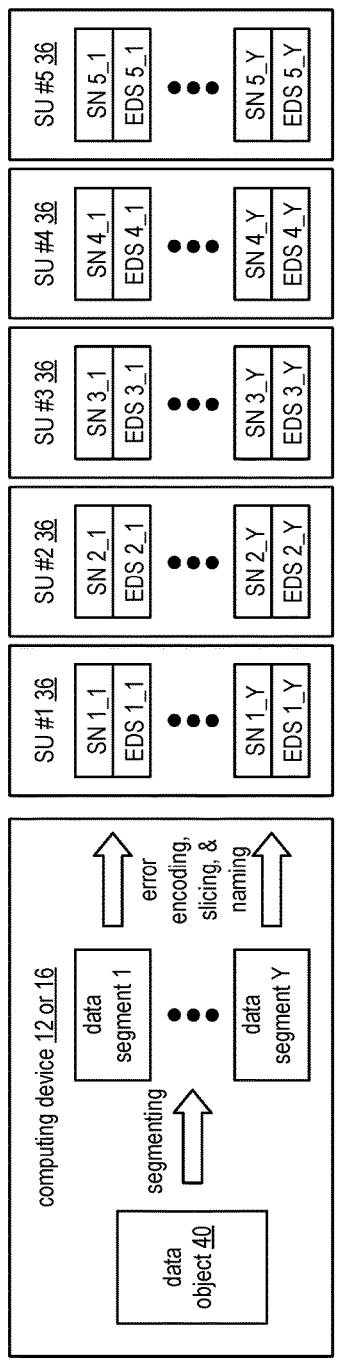
FIG. 3
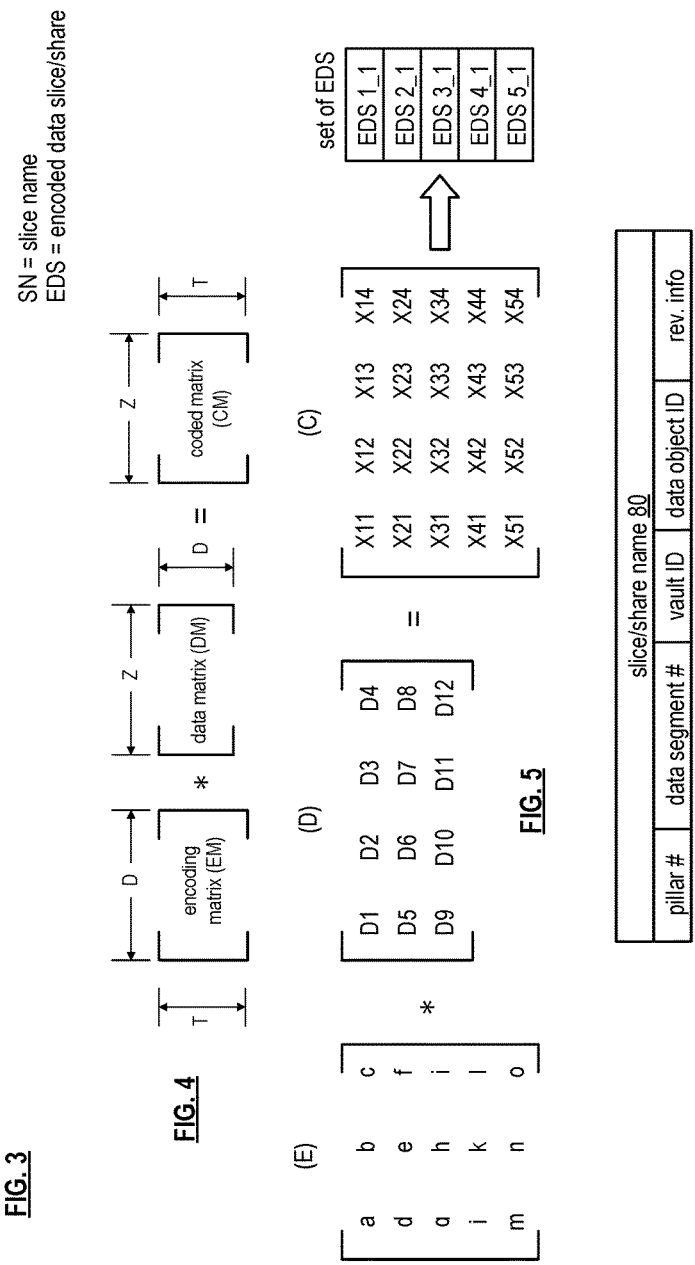
FIG. 4
FIG. 5
FIG. 6

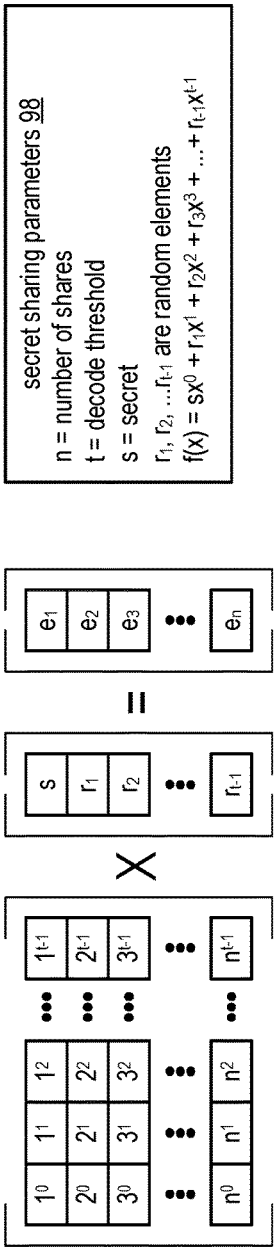

FIG. 9A
Shamir secret sharing scheme 90 equivalence encoding matrix 92 × data vector 94 = shares 96 secret sharing parameters 98
n = number of shares
t = decode threshold
s = secret
$r_1, r_2, \ldots r_{t-1}$ are random elements
$f(x) = sx^0 + r_1x^1 + r_2x^2 + r_3x^3 + \ldots + r_{t-1}x^{t-1}$

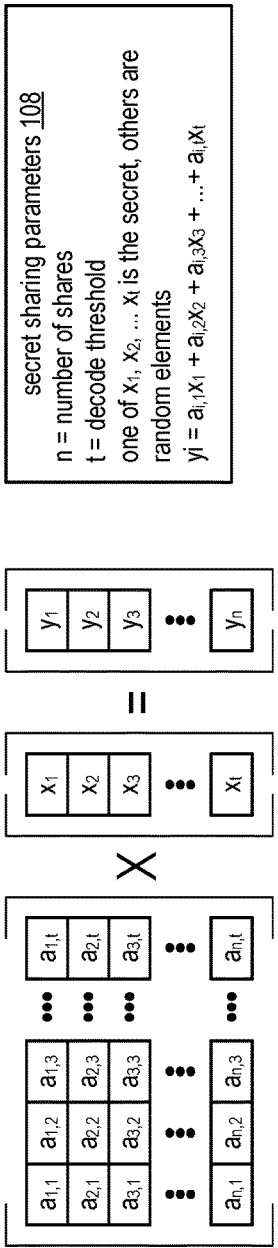

FIG. 9B
Blakley secret sharing scheme 100 equivalence encoding matrix 102 × data vector 104 = shares 106 secret sharing parameters 108
n = number of shares
t = decode threshold
one of $x_1, x_2, \ldots x_t$ is the secret, others are random elements
$y_i = a_{i,1}x_1 + a_{i,2}x_2 + a_{i,3}x_3 + \ldots + a_{i,t}x_t$

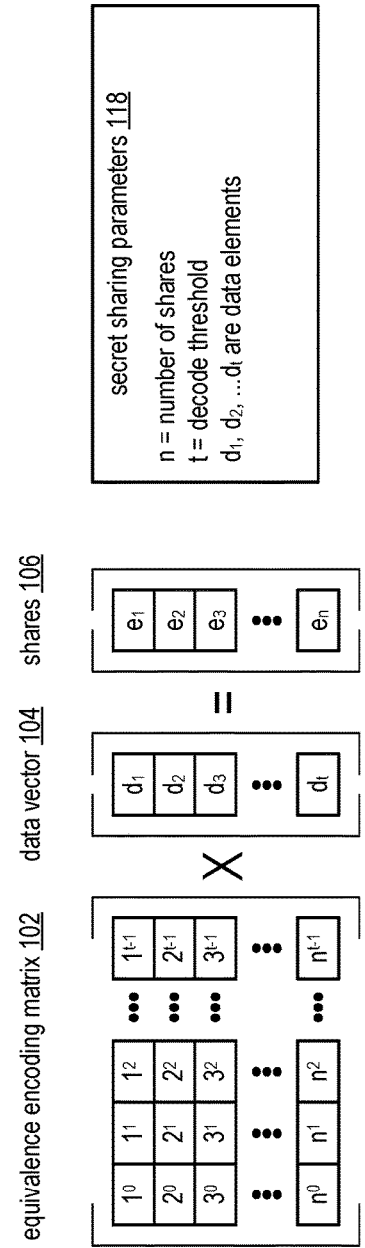

FIG. 9C
Rabin IDA secret sharing scheme 110 equivalence encoding matrix 112 × data vector 114 = shares 116 secret sharing parameters 118
n = number of shares
t = decode threshold
$d_1, d_2, \ldots d_t$ are data elements

APPLICATION OF SECRET SHARING SCHEMES AT MULTIPLE LEVELS OF A DISPERSED STORAGE NETWORK

CROSS-REFERENCE TO RELATED APPLICATIONS

The present U.S. Utility Patent Application claims priority pursuant to 35 U.S.C. § 120, as a continuation-in-part (CIP) of U.S. Utility patent application Ser. No. 15/427,934, entitled "ALLOCATING distributed STORAGE AND TASK EXECUTION RESOURCES," filed Feb. 8, 2017, issuing as U.S. Pat. No. 9,813,501 on Nov. 7, 2017, which claims priority pursuant to 35 U.S.C. § 120 as a continuation of U.S. Utility application Ser. No. 13/959,006, entitled "ALLOCATING DISTRIBUTED STORAGE AND TASK EXECUTION RESOURCES," filed Aug. 5, 2013, now issued as U.S. Pat. No. 9,648,087, which claims priority pursuant to 35 U.S.C. § 119(e) to U.S. Provisional Application No. 61/711,106, entitled "PRIORITIZING TASKS IN A DISTRIBUTED STORAGE AND TASK NETWORK," filed Oct. 8, 2012, all of which are hereby incorporated herein by reference in their entirety and made part of the present U.S. Utility Patent Application for all purposes.

BACKGROUND OF THE INVENTION

Technical Field of the Invention

This invention relates generally to computer networks, and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

BRIEF DESCRIPTION OF THE SEVERAL VIEWS OF THE DRAWING(S)

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice/share (EDS) in accordance with the present disclosure;

FIG. 9A is a diagram illustrating an example of a matrix representation of a Shamir secret sharing scheme in accordance with the present disclosure;

FIG. 9B is a diagram illustrating an example of a matrix representation of a Blakley secret sharing scheme in accordance with the present disclosure;

FIG. 9C is a diagram illustrating an example of a matrix representation of a Rabin information dispersal algorithm (IDA) secret sharing scheme in accordance with the present disclosure;

DETAILED DESCRIPTION

Figure 1:
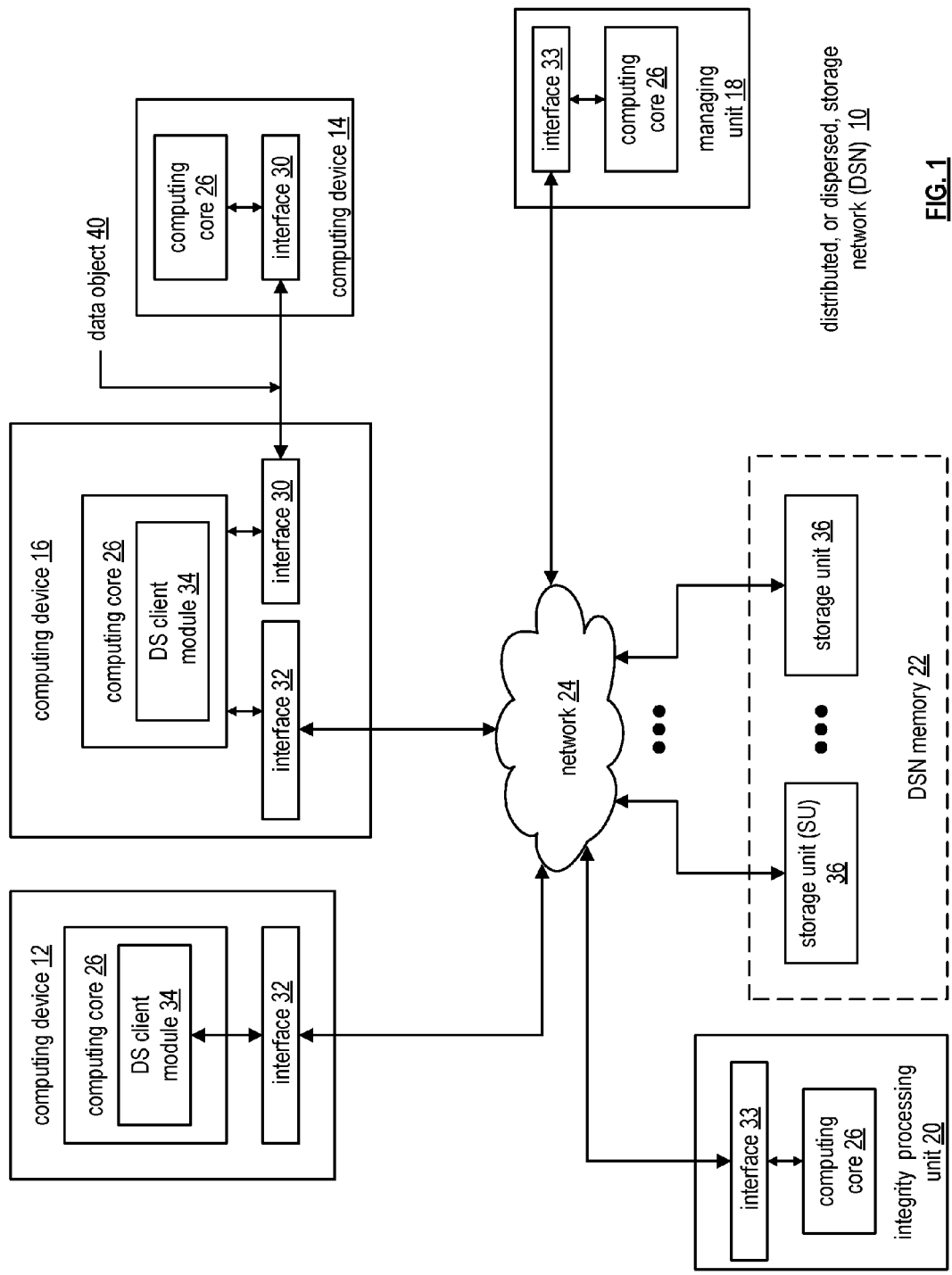
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public interne systems; and/or one or more local area networks (LAN) and/or wide area networks (WAN).

Figure 2:
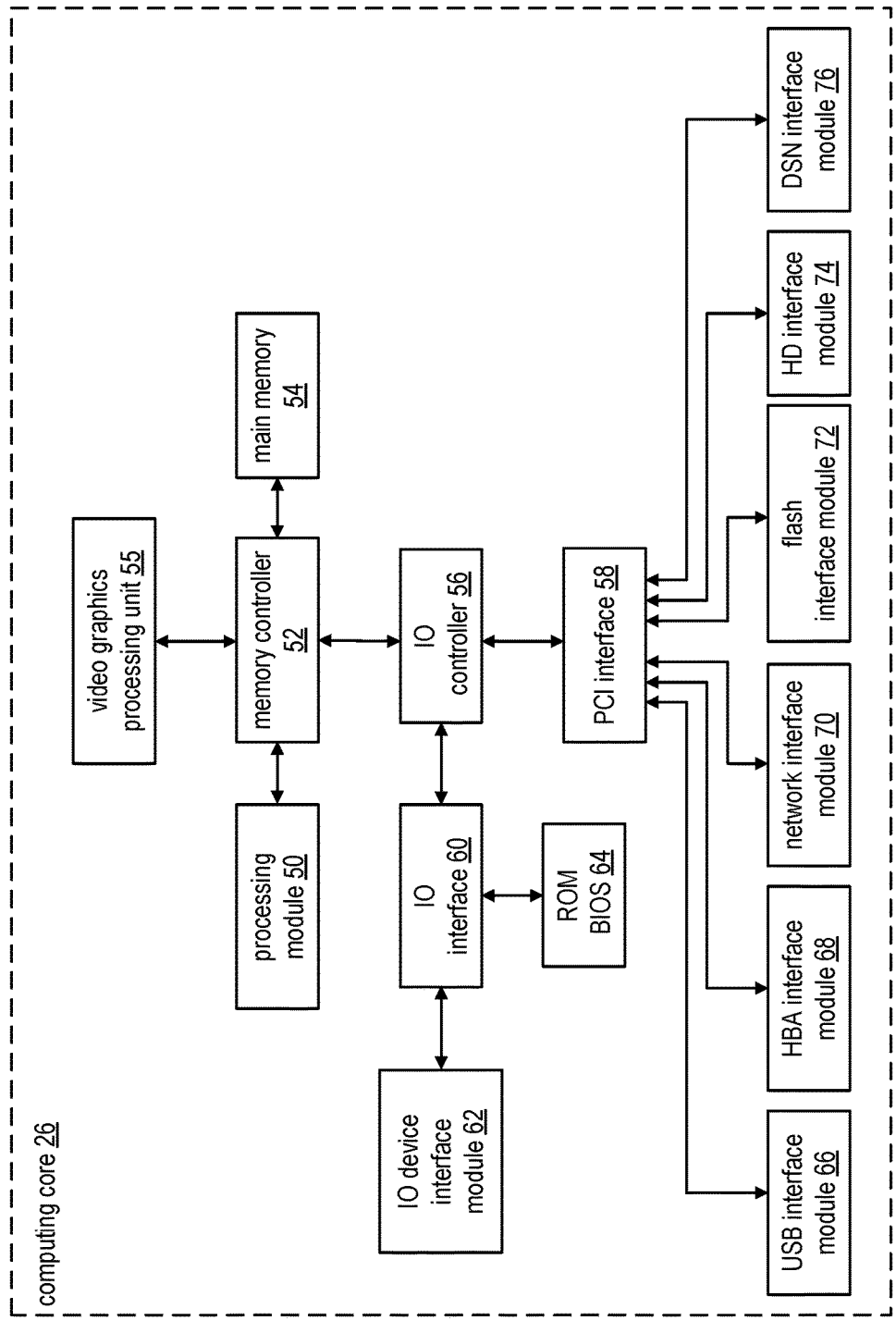
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices/shares and key slices, updating hardware, rebooting software, restarting a particular software process, performing an upgrade, installing a software patch, loading a new software revision, performing an off-line test, prioritizing tasks associated with an online test, etc.), etc.

Each of the computing devices 12-16, the managing unit 18, integrity processing unit 20 and (in various embodiments) the storage units 36 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall addressing namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

To support data storage integrity verification within the DSN 10, the integrity processing unit 20 (and/or other devices in the DSN 10) may perform rebuilding of 'bad' or missing encoded data slices or shares. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include or identify an encoding function (e.g., information dispersal algorithm, threshold based secret sharing function, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters (also referred to as "secret sharing parameters" when a threshold based secret sharing function is used for encoding to produce encoded data shares) may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice/share name 80 is shown in FIG. 6. As shown, the slice/share name (SN) 80 includes a pillar number of the encoded data slice/share (e.g., one of 1-T), a data segment number (e.g., one of 1-Y), a vault identifier (ID), a data object identifier (ID), and may further include revision level information of the encoded data slices. The slice name functions as at least part of a DSN address for the encoded data/share slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y. In embodiments of the disclosure in which a threshold based secret sharing scheme (such as described more fully below) is selected to produce the set of encoded data slices, the encoded data slices may be alternatively referred to herein as "encoded data shares" or "shares".

Figure 7:
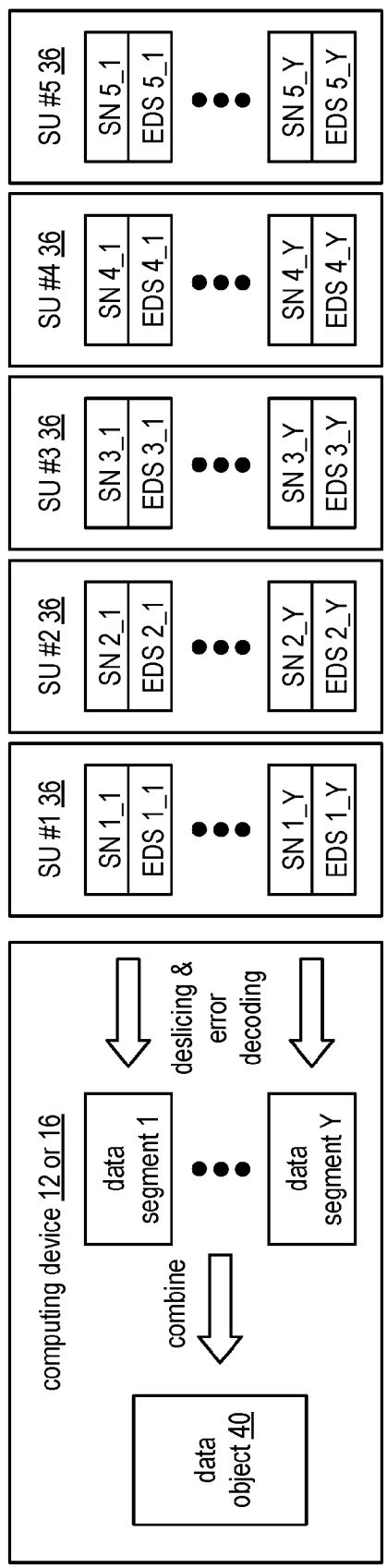
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices (or shares) per data segment. As a specific example, the computing device retrieves a read threshold number of encoded data slices.

Figure 8:
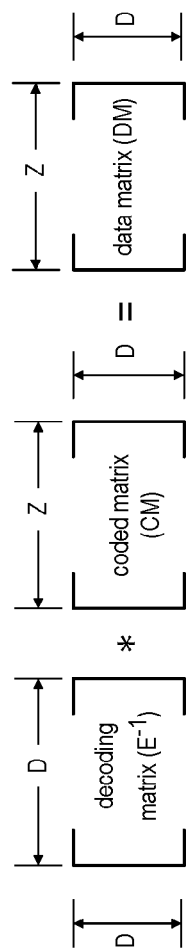
FIG. 8 is a schematic block diagram of a generic example of an error decoding function in accordance with the present disclosure.

In order to recover a data segment from a decode threshold number of encoded data slices/shares, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

As described more fully below, a data segment can be encoded using a threshold based secret sharing function to produce the one or more sets of shares. Examples of secret sharing function includes all-or-nothing transform with Reed Solomon coding (AONT-RS) secret sharing, Blakley's Secret Sharing, Shamir Secret Sharing, Systematic Shamir, Rabin's information dispersal algorithm (IDA) secret sharing function, etc. As noted, when a threshold based secret sharing scheme is utilized to generate shares/sub-shares, the relevant dispersed storage error encoding parameters described herein are referred to as secret sharing parameters.

In addition, the encoding processes and matrix multiplication examples described herein may be performed using one or more such threshold based secret sharing schemes, including use of differing secret sharing schemes at different levels (e.g., to generate sub-shares for storage in memory devices of a storage unit). In addition to the reliability, rebuilding and performance advantages of error coding at different levels, the novel methodologies described herein offer a number of security advantages. Such advantages include a greater tolerance for compromise of memory devices (e.g., disk drives). For example, in a system using a 10-of-16 dispersal across storage units, and a 10-of-12 encoding across disk drives in the storage unit, an attacker needs to obtain a minimum of 100 disks to recover meaningful information, and needs at least 10 disks to recover a single top-level slice. In addition, such an approach may simplify and reduce the cost of disk drive disposal or replacement. In the above example, only 3 disk drives (of 12 total) from each storage unit would need to be wiped, shredded, or otherwise securely destroyed in order to obtain assurance that stored data is unrecoverable.

Referring now to FIGS. 9A-9C, diagrams illustrating examples of matrix representations of linear coding schemes 90, 100, 110 (e.g., secret sharing schemes) in a form to expose matrix multiplication of an equivalence encoding matrix 92, 102, 112 by a data vector 94, 104, 114 to produce a set of shares 96, 106, 116. Additional linear coding schemes of still further secret sharing schemes may be expressed in a similar fashion. The diagrams further include secret sharing parameters 98, 108, 118 associated with the respective secret sharing schemes (e.g., number of shares, a decode threshold, a secret, a closed form formula, etc.). More particularly, FIG. 9A illustrates an example of the matrix multiplication for a Shamir secret sharing scheme 90. FIG. 9B illustrates an example of the matrix multiplication for a Blakley secret sharing scheme 100. FIG. 9C illustrates an example of the matrix multiplication for a Rabin information dispersal algorithm (IDA) secret sharing scheme 110. The expression of a secret sharing scheme in such a matrix multiple multiplication fashion exposes the equivalence encoding matrix 92, 102, 112 which may be utilized, for example, when generating shares and/or sub-shares for storage in a set of storage units, or performing a zero information gain rebuilding process to rebuild a share of a set of shares 96, 106, 116, where the share is associated with a storage error.

In an example, an AONT-RS threshold based secret sharing scheme is used to generate encoded data shares/sub-shares at one or more levels of a DSN. In this example, a message block/data segment is encrypted with a symmetric-key algorithm to produce a ciphertext. A hash of the ciphertext is computed, and a digest of the hash function is then XORed with the encryption key to produce a difference value. The ciphertext and the difference value are then concatenated and dispersed (e.g., using a type of systemic Reed-Solomon coding) to produce shares for distribution to storage units. Data integrity may be enhanced by appending a known value (or "canary") to the message block prior to encryption. The known value is stripped from the message block following a subsequent decryption process.

Figure 10:
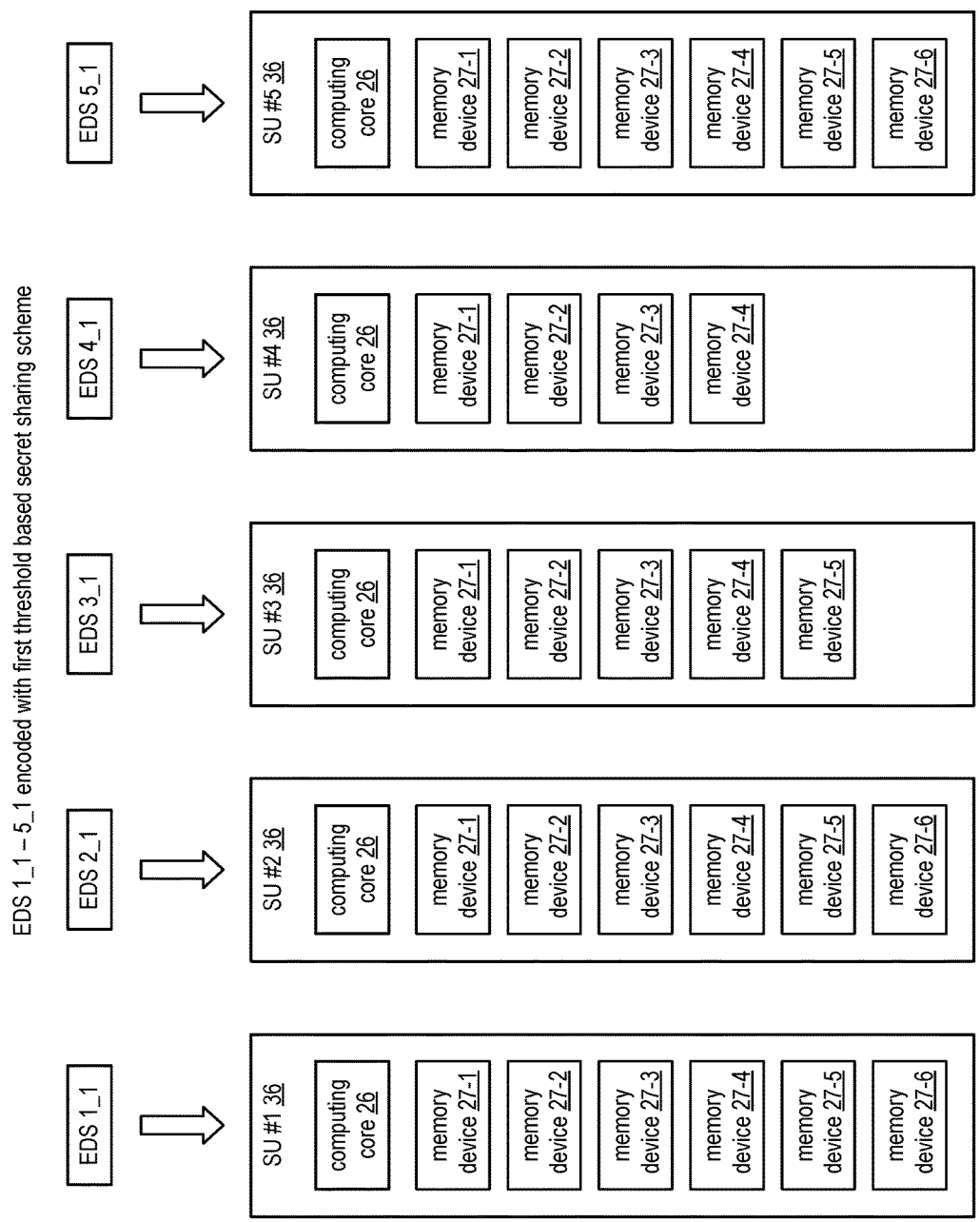
FIG. 10 is a schematic block diagram of an embodiment of a set of storage units in accordance with the present disclosure.

FIG. 10 is a schematic block diagram of an embodiment of a set of storage units (SU 1-5). Each of the storage units includes a computing core 26, or portions thereof, and a plurality of memory devices 27-1 through 27-n, where n is an integer greater than or equal to 2. Each storage unit may include more or less memory devices than shown, and each memory device includes one or more of a hard drive, a solid-state drive, dynamic random access memory, etc. Each storage unit is shown receiving an encoded data share of a set of encoded data shares. For example, storage unit #1 is receiving a first encoded data share (EDS 1_1) of the set; storage unit #2 is receiving a second encoded data share (EDS 2_1) of the set; and so on. Note that the "1_1" associated with the EDS 1_1 corresponds to the pillar number (i.e., the first number) and the data segment number (i.e., the second number). As such, EDS 1_1, is the first pillar number of the set for a first data segment of a data file or data object being encoded.

Figure 11:
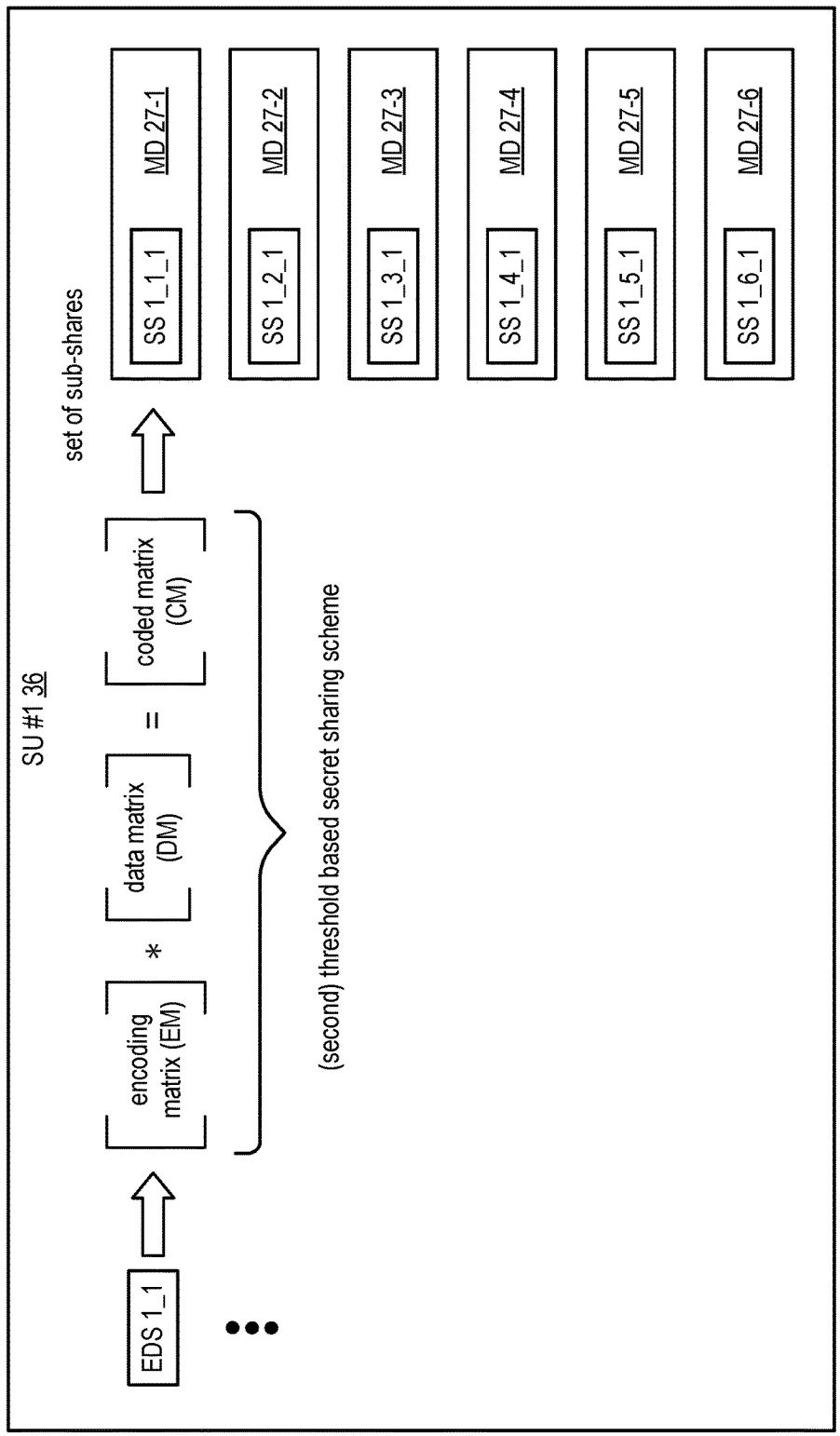
FIG. 11 is a schematic block diagram of an example of a storage unit processing an encoded data share in accordance with the present disclosure.

FIG. 11 is a schematic block diagram of an example of a first storage unit (e.g., SU #1) processing a first encoded data share (e.g., EDS 1_1). As shown, the first storage unit converts the encoded data share into a data matrix (DM). For example, the first storage unit divides the first encoded data share into a plurality of data blocks, which are arranged into row and columns to form the data matrix. As a specific example, the first storage unit divides the first encoded data share into 12 data blocks and arranges the data blocks into a data matrix in a manner similar to the data matrix of FIG. 5.

With reference to FIG. 11, the first storage unit then matrix multiplies the data matrix (DM) with an encoding matrix (EM) to produce a coded matrix (CM). In this example, the coding matrix (CM) includes six rows and three columns, the data matrix (DM) includes three rows and four columns, and the coded matrix (CM) includes six rows and four columns. The resulting coded matrix is processed to produce six encoded data sub-shares (SS 1_1_1 through SS 1_6_1), with a numbering convention of pillar number_ sub pillar number_data segment number.

Each encoded data sub-share is stored in a separate memory device of the first storage unit. For example, encoded data sub-share 1_1_1 is stored in memory device (MD) 27-1; encoded data sub-share 1_2_1 is stored in memory device (MD) 27-2; encoded data sub-share 1_3_1 is stored in memory device (MD) 27-3; and so on. Note that the first storage unit may further store the first encoded data share in addition to the sub-shares. As such, when the first storage unit receives a read request for the first encoded data share, it can use the stored copy of the share or reconstruct it from the encoded data sub-shares. When the first storage unit only stores the sub-shares, for each read request for the first encoded data share, the storage unit reconstructs it from the sub-shares.

Figure 12:
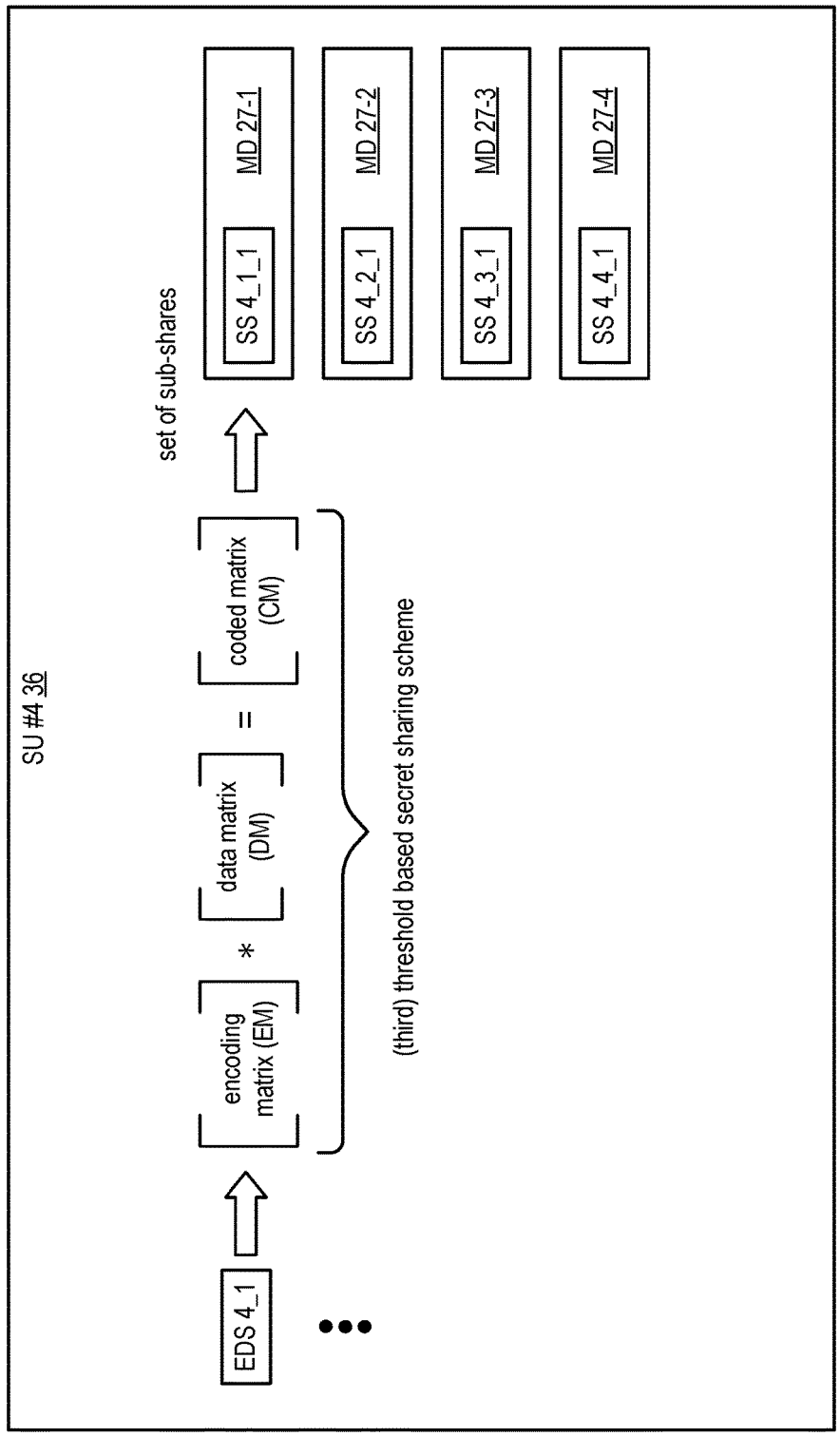
FIG. 12 is a schematic block diagram of another example of a storage unit processing an encoded data share in accordance with the present disclosure.

FIG. 12 is a schematic block diagram of an example of a fourth storage unit (SU #4) processing a fourth encoded data share (EDS 4_1). As shown, the fourth storage unit converts the encoded data share into a data matrix (DM). For example, the fourth storage unit divides the fourth encoded data share into a plurality of data blocks, which are arranged into row and columns to form the data matrix. As a specific example, the fourth storage unit divides the fourth encoded data share into twelve data blocks and arranges the data blocks into a data matrix in a manner similar to the data matrix of FIG. 5.

With reference to FIG. 12, the fourth storage unit then matrix multiplies the data matrix (DM) with an encoding matrix (EM) to produce a coded matrix (CM). In this example, the coding matrix (CM) includes four rows and three columns, the data matrix (DM) includes three rows and four columns, and the coded matrix (CM) includes four rows and four columns. The resulting coded matrix is processed to produce four encoded data sub-shares (SS 4_1_1 through SS 4_4_1), with a numbering convention of pillar number_ sub pillar number_data segment number.

Each encoded data sub-share is stored in a separate memory device of the first storage unit. For example, encoded data sub-share 4_1_1 is stored in memory device (MD) 27-1; encoded data sub-share 4_2_1 is stored in memory device (MD) 27-2; encoded data sub-share 4_3_1 is stored in memory device (MD) 27-3; and encoded data sub-share 4_4_1 is stored in memory device (MD) 27-4. Note that the fourth storage unit may further store the fourth encoded data share in addition to the sub-shares. As such, when the fourth storage unit receives a read request for the fourth encoded data share, it can use the stored copy of the share or reconstruct it from the encoded data sub-shares. When the fourth storage unit only stores the sub-shares, then, for each read request for the fourth encoded data share, the storage unit reconstructs it from the sub-shares. Note that, from storage unit to storage unit, each may perform a different level of encoding (i.e., use a different secret sharing scheme and/or secret sharing parameters, encoding matrix and/or organize the data matrix differently). Variances in encoding used by the storage units may be based on the number of memory devices within the storage unit, the type of memory devices, the age or reliability of the memory devices, etc.

Figure 13:
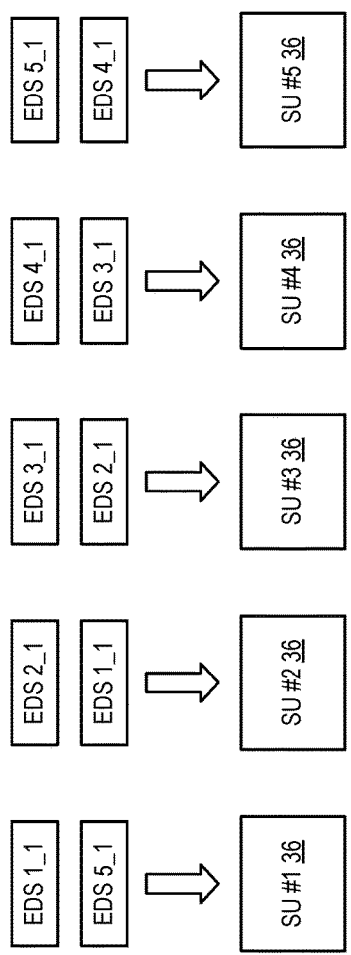
FIG. 13 is a schematic block diagram of an example of storage units receiving two encoded data shares for processing in accordance with the present disclosure.

FIG. 13 is a schematic block diagram of an example of storage units receiving two encoded data shares for processing and storing. In this example, the first storage unit (SU #1) receives encoded data shares EDS 1_1 and EDS 5_1; the second storage unit (SU #2) receives encoded data shares EDS 1_1 and EDS 2_1; storage unit (SU #3) receives encoded data shares EDS 3_1 and EDS 2_1; storage unit (SU #4) receives encoded data shares EDS 4_1 and EDS 3_1; and storage unit (SU #5) receives encoded data shares EDS 5_1 and EDS 4_1. As shown, each encoded data share is provided to two storage units for processing and storage, which is discussed with reference to FIG. 14.

Figure 14:
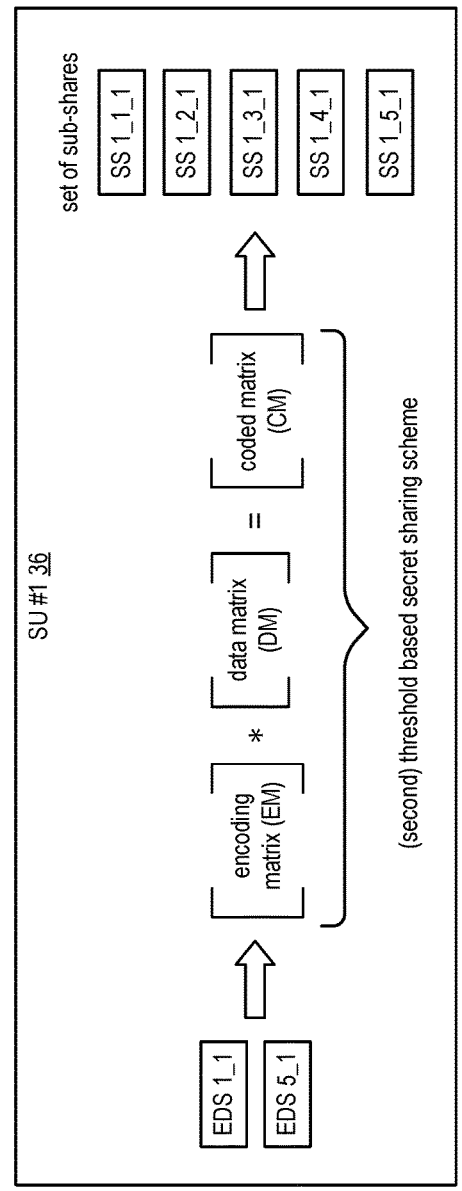
FIG. 14 is a schematic block diagram of an example of a storage unit processing two encoded data shares in accordance with the present disclosure.

FIG. 14 is a schematic block diagram of an example of a first storage unit processing two encoded data shares EDS 1_1 and EDS 5_1. As shown, the first storage unit converts the first and fifth encoded data shares into a data matrix (DM). For example, the first storage unit divides the first and fifth encoded data shares into a plurality of data blocks, which are arranged into row and columns to form the data matrix. As a specific example, the first storage unit divides the first and fifth encoded data shares into 12 data blocks and arranges the data blocks into a data matrix in a manner similar to the data matrix of FIG. 5.

With reference to FIG. 14, the first storage unit then matrix multiplies the data matrix (DM) with an encoding matrix (EM) to produce a coded matrix (CM). In this example, the coding matrix (CM) includes five rows and three columns, the data matrix (DM) includes three rows and four columns, and the coded matrix (CM) includes five rows and four columns. The resulting coded matrix is processed to produce five encoded data sub-shares (SS 1_1_1 through SS 1_5_1), with a numbering convention of pillar number_ sub pillar number_data segment number.

Each encoded data sub-share is stored in a separate memory device of the first storage unit. For example, encoded data sub-share 1_1_1 is stored in memory device (MD) 27-1; encoded data sub-share 1_2_1 is stored in memory device (MD) 27-2; encoded data sub-share 1_3_1 is stored in memory device (MD) 27-3; and so on. Note that the first storage unit may further store each of the first and fifth encoded data shares in addition to the sub-shares. As such, when the first storage unit receives a read request for the first and/or fifth encoded data shares, it can use the stored copy of the share(s) or reconstruct one or both share from the encoded data sub-shares. When the first storage unit only stores the sub-shares, for each read request for the first and/or fifth encoded data shares, the storage unit reconstructs one or both from the sub-shares.

Figure 15:
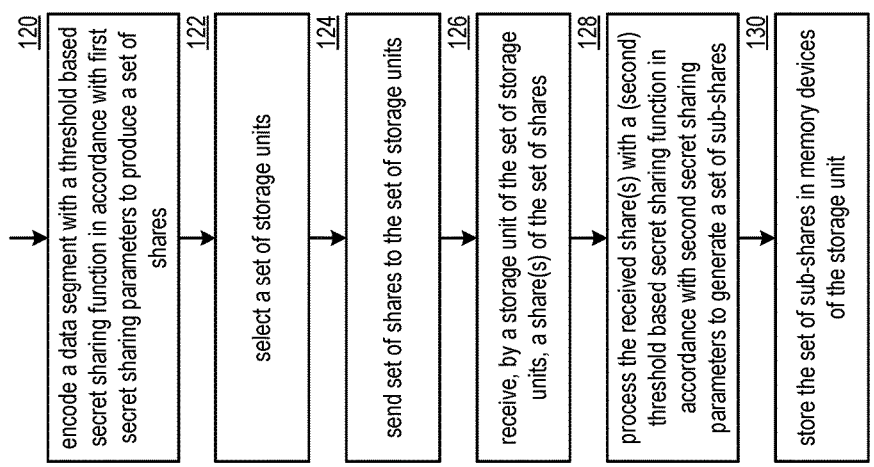
FIG. 15 is a logic diagram of an example of a method of encoding and storing a data segment in accordance with the present disclosure.

FIG. 15 is a logic diagram of an example of a method of encoding and storing a data segment that begins at step 120 where a computing device of a dispersed storage network (DSN) dispersed storage error encodes a data segment of a data file, using a threshold based secret sharing function (alternatively referred to herein as a secret sharing scheme in combination with associated secret sharing parameters) in accordance with first secret sharing parameters, to produce a set of encoded data shares. For example, the computing device is one or more of computing devices 12-16 of FIG. 1 and performs the encoding of the data segment as shown in FIGS. 3-5. The method continues at step 122 where the computing device determines a storage and error encoding scheme for storing the set of encoded data shares, including selecting a set of storage units of the DSN. For example, the computing device determines to store each encoded data share, in respective storage units of the selected set of storage units, as a set of encoded data sub-shares only. As another example, the computing device determines to store each encoded data share as a set of encoded data sub-shares and to store a copy of the encoded data share.

The method continues at step 124 where the computing devices sends the set of encoded data shares to the selected set of storage units in accordance with the storage and error encoding scheme. The method continues at step 126 where a first storage unit of the set of storage units receives one or more encoded data shares of the set of encoded data shares.

The method continues at step 128 where the first storage unit processes the one or more encoded data shares in accordance a threshold based secret sharing scheme (that may differ from the secret sharing scheme used to produce the encoded data shares) in accordance with second secret sharing parameters to produce a first set of encoded data sub-shares. For example, the first storage unit processes a first encoded data share as discussed with reference to FIG. 11. The method continues at step 130 where the first storage unit stores the first set of encoded data sub-shares in a set of memory devices of the first storage unit. Note that the first storage unit may further store the first encoded data share. Further note that a threshold number of encoded data sub-shares of the first set of encoded data sub-shares is decodable to recover the first encoded data share.

Once the first encoded data share has been processed and stored (e.g., as a copy thereof and/or as a set of sub-shares), the first storage unit may receive a read request for the first encoded data shares. If the storage unit is storing a copy of the encoded data share and it is free of errors (i.e., no disk errors, bit errors, bad sector, disk block, write error, read error, malfunction which causes a portion of the written data to be corrupted, and/or is not stored in a bad memory device), the storage unit provides the copy in response to the read request.

If, however, the copy of the encoded data shares is not error-free, the storage unit reconstructs or rebuilds the encoded data share from the set of encoded data sub-shares. The storage unit provides the reconstructed encoded data share in response to the read request.

Figure 16:
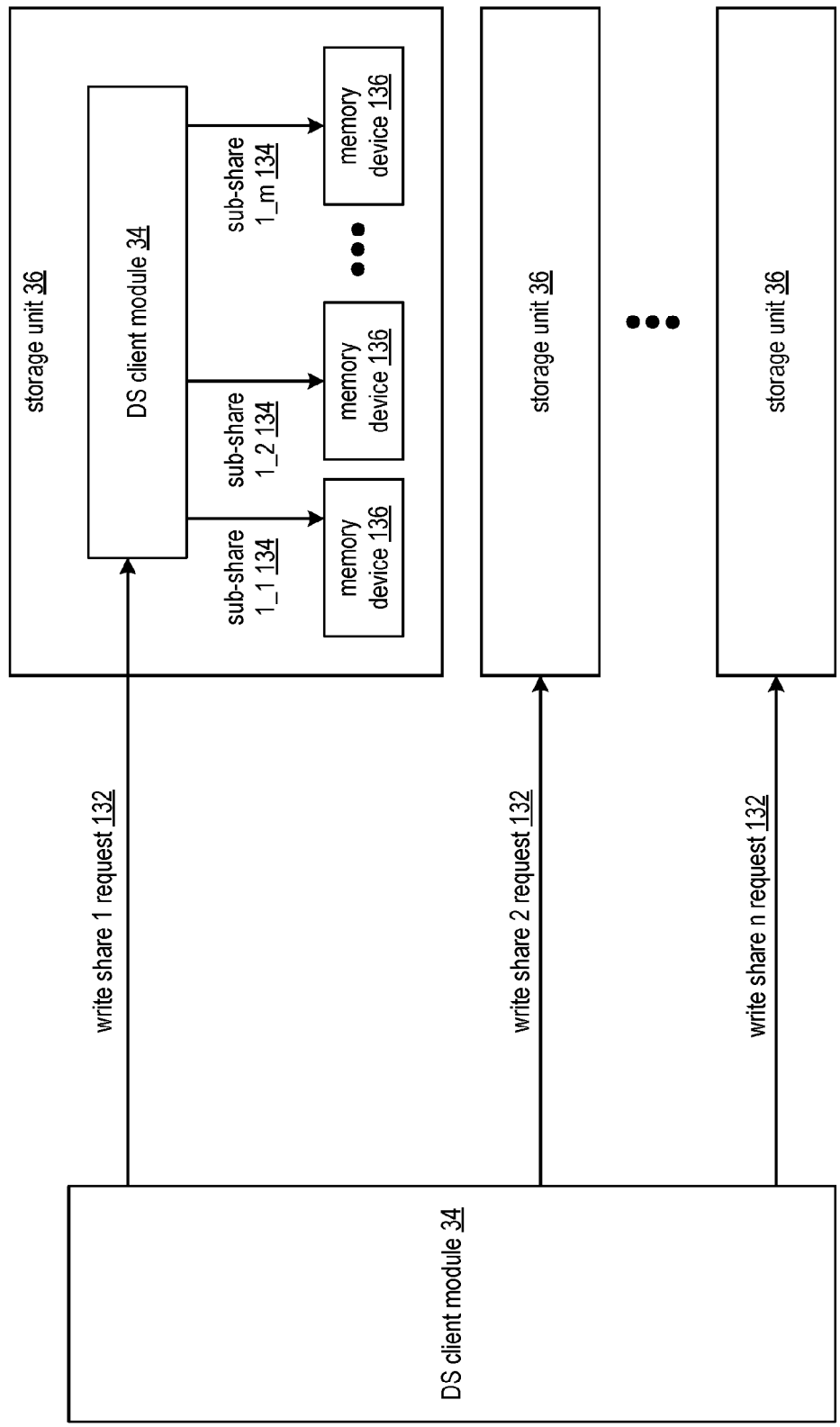
FIG. 16 is a schematic block diagram of an example of encoding and storing a data segment in accordance with the present disclosure.

FIG. 16 is a schematic block diagram of another embodiment of a distributed computing system that includes the distributed storage (DS) client module 34 and a set of storage units 36 of FIG. 1. Each storage unit 36 includes a computing core (as shown in FIG. 2, or components thereof), a DS client module 34 and a plurality of memory devices 136 for storing dispersed storage (DS) error encoded data. The system functions to store data as shares in memory devices 136 of the set of storage units 36.

In an example of operation, the DS client module 34 segments the data to produce a plurality of data segments. For each data segment, the DS client module 34 encodes the data segment using a threshold based secret sharing function in accordance with secret sharing parameters to produce a set of shares. The DS client module 34 determines the secret sharing parameters based on one or more of a number of storage units 36 of the set of storage units, a sub-sharing capability of the set of storage units 36, and a reliability level(s) of storage units 36 of the set of storage units. For example, the DS client module 34 determines a pillar width number (e.g., number of storage units of the set of storage units) to be five when five storage units 36 of the set of storage units 36 indicate a favorable sub-sharing capability level.

The DS client module 34 generates a set of write share requests 1-*n* 132 that includes the set of shares. The DS client module 34 outputs the set of write share requests 1-*n* 132 to the set of storage units 36. For each storage unit 36, a corresponding DS client module 34 of the storage unit 36 determines second secret sharing parameters based on one or more of a number of memory devices, a reliability level of the memory devices, an available capacity level of the memory devices, random selection, and a memory device loading level. For example, the corresponding DS client module 34 of the storage unit 36 determines secret share threshold number of the second secret sharing parameters to be three when three memory devices compare favorably to a reliability level (e.g., above a minimum reliability threshold level).

The DS client module 34 of the storage unit 36 encodes a share of a corresponding write share request 132 using the threshold based secret sharing function in accordance with the second secret sharing parameters to produce a set of sub-shares 134. The DS client module 34 of the storage unit 36 stores the set of sub-shares 134 in corresponding memory devices 136 of the storage unit 36. The method to store the data is discussed in greater detail with reference to FIG. 17.

Figure 17:
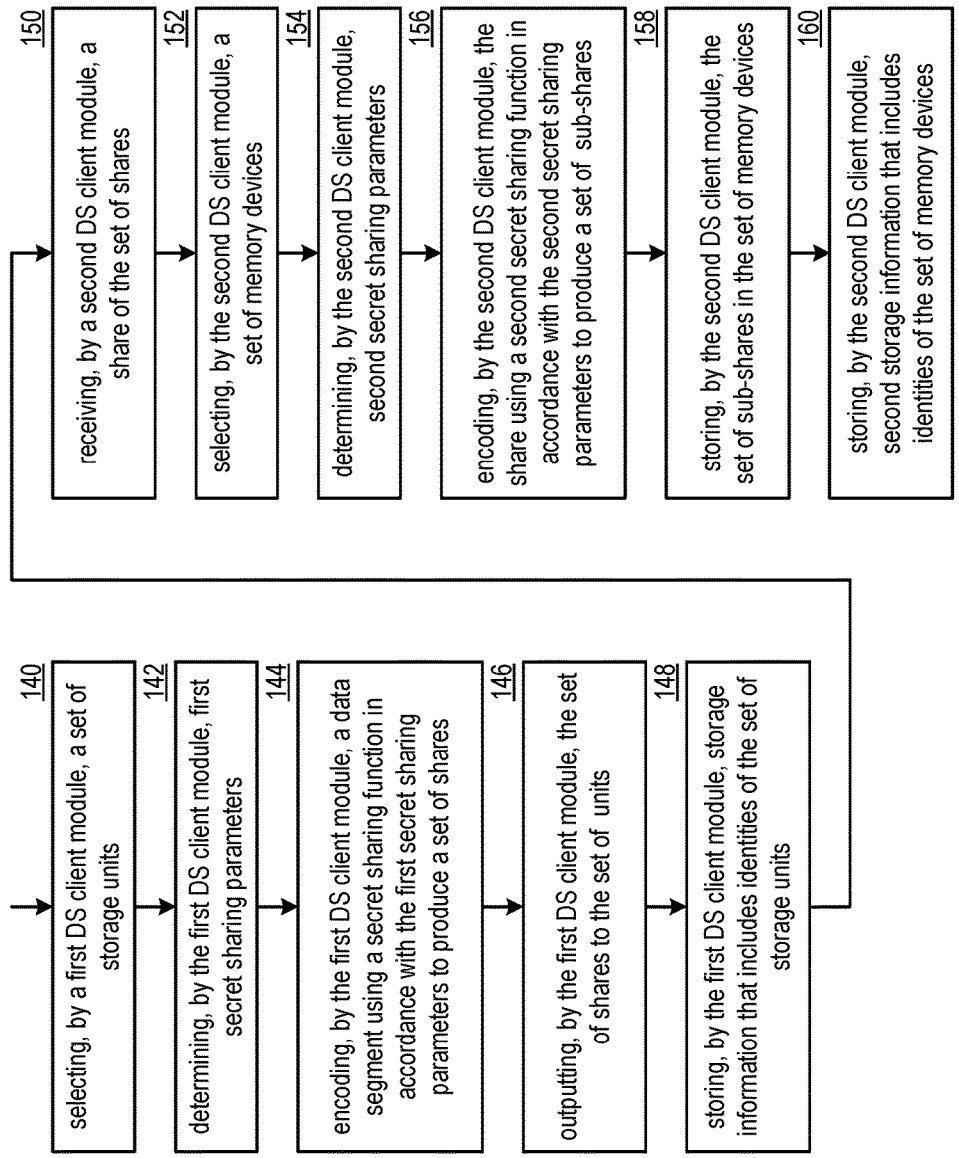
FIG. 17 is a logic diagram of another example of a method of encoding and storing a data segment in accordance with the present disclosure.

FIG. 17 is a flowchart illustrating another example of encoding and storing data. The method begins at step 140 where a first distributed storage (DS) client module selects a set of storage units. The selecting may be based on one or more of a lookup, receiving identities of the set of storage units, and sub-slicing capabilities of the set of storage units. The method continues at step 142 where the first DS client module determines first secret sharing parameters. The determining may be based on one or more of a number of storage units of the set of storage units, sub-sharing capability of the set of storage units, and a reliability level(s) of storage units of the set of storage units.

The method continues at step 144 where the first DS client module encodes a data segment using a threshold based secret sharing function in accordance with the first secret sharing parameters to produce a set of shares. The method continues at step 146 where the first DS client module outputs the set of shares to the set of storage units. The method continues at step 148 where the first DS client module stores storage information with regards to the set of storage units. The storage information includes one or more of identities of the set of storage units, share names corresponding to the set of encoded data shares, the first secret sharing parameters, and a vault identifier (ID) associated with the data segment. The storing includes storing the storage information in at least one of a local memory and the set of storage units.

The method continues at step 150 where a second DS client module receives a share of the set of shares. The method continues with step 152 where the second DS client module selects a set of memory devices. The selecting may be based on one or more of a lookup, receiving memory device identifiers, a memory device reliability level, a memory device available storage capacity level, and a memory device available input/output capacity level. The method continues at step 154 where the second DS client module determines second secret sharing parameters. The determining may be based on one or more of a number of memory devices of the set of memory devices, the memory device reliability level, the memory device available storage capacity level, the memory device available input/output capacity level, and the first secret sharing parameters. For example, the second DS client module selects a threshold number to be substantially the same as the number of memory devices of the set of memory devices.

The method continues at step 156 where the second DS client module encodes the share using the threshold based secret sharing function in accordance with the second secret sharing parameters to produce a set of sub-shares. The method continues at step 158 where the second DS client module stores the set of sub-shares in the selected set of memory devices. The method continues at step 160 where the second DS client module stores second storage information with regards to the selected set of memory devices. The storing includes generating the second storage information to include one or more of identities of the set of the selected memory devices, a share name, the second secret sharing parameters, a vault ID, and sub-share names corresponding to the set of sub-shares. The storing further includes storing the second storage information in at least one of a local memory, at least one of the memory devices of the set of memory devices, and the set of storage units.

The methods described above in conjunction with the computing device 16 and storage units 1-$n$ can alternatively be performed by other modules (e.g., DS client modules 34) of a dispersed storage network or by other devices (e.g., integrity processing unit 20). Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
dispersed storage error encoding, by a computing device of a dispersed storage network (DSN), a data segment of a data file to produce a set of encoded data shares, wherein the dispersed storage error encoding uses a first threshold based secret sharing scheme in accordance with first secret sharing parameters;
selecting, by the computing device, a set of storage units of the DSN for storing the set of encoded data shares;
sending, by the computing device, the set of encoded data shares to the set of storage units;

receiving, by a first storage unit of the set of storage units, a first encoded data share of the set of encoded data shares;

encoding, by the first storage unit, the first encoded data share using a second threshold based secret sharing scheme in accordance with second secret sharing parameters to produce a first set of encoded data sub-shares, wherein the first secret sharing parameters differ from the second secret sharing parameters; and storing, by the first storage unit, the first set of encoded data sub-shares in a set of memory devices of the first storage unit, wherein a threshold number of encoded data sub-shares of the first set of encoded data sub-shares is decodable to recover the first encoded data share.

2. The method of claim 1 further comprises:

receiving, by the first storage unit, a read request for the first encoded data share from a requesting device;

rebuilding, by the first storage unit, the first encoded data share from at least the threshold number of encoded data sub-shares of the first set of encoded data sub-shares; and sending, by the first storage unit, the rebuilt first encoded data share to the requesting device.

3. The method of claim 1 further comprises:

receiving, by a second storage unit of the set of storage units, a second encoded data share of the set of encoded data shares;

encoding, by the second storage unit, the second encoded data share using a third threshold based secret sharing scheme in accordance with third secret sharing parameters to produce a second set of encoded data sub-shares; and storing, by the second storage unit, the second set of encoded data sub-shares in a set of memory devices of the second storage unit, wherein a threshold number of encoded data sub-shares of the second set of encoded data sub-shares is decodable to recover the second encoded data share.

4. The method of claim 3, wherein the threshold number of encoded data sub-shares of the first set of encoded data sub-shares differs from the threshold number of encoded data sub-shares of the second set of encoded data sub-shares.

5. The method of claim 1, wherein the first threshold based secret sharing scheme and the second threshold based secret sharing scheme utilize a common threshold based secret sharing function.

6. The method of claim 1, wherein the first threshold based secret sharing scheme and the second threshold based secret sharing scheme utilize differing threshold based secret sharing functions.

7. The method of claim 1 further comprises:

determining the first secret sharing parameters based on one or more of a number of storage units of the set of storage units, a sub-sharing capability of one or more storage units of the set of storage units, or a reliability level of one or more storage units of the set of storage units.

8. The method of claim 1 further comprises:

determining the second secret sharing parameters based on one or more of a number of memory devices of the first storage unit, a reliability level of memory devices of the first storage unit, an available capacity level of the memory devices of memory devices of the first storage unit, or random selection.

9. The method of claim 1, wherein the first threshold based secret sharing scheme is an all-or-nothing transform with Reed Solomon coding (AONT-RS) secret sharing scheme.

10. The method of claim 1, wherein the first threshold based secret sharing scheme and the second threshold based secret sharing scheme are differing schemes from the group including an all-or-nothing transform with Reed Solomon coding (AONT-RS) secret sharing function, a Shamir secret sharing function, a Blakley secret sharing function, and a Rabin information dispersal algorithm (IDA) secret sharing function.

11. A computer readable storage device comprises:

a first storage section that stores operational instructions that, when executed by a computing device of a dispersed storage network (DSN), causes the computing device to:

dispersed storage error encode, using a first threshold based secret sharing scheme in accordance with first secret sharing parameters, a data segment of a data file to produce a set of encoded data shares;

select a set of storage units of the DSN for storing the set of encoded data shares; and send the set of encoded data shares to the set of storage units; and a second storage section that stores operational instructions that, when executed by a first storage unit of the set of storage units, causes the first storage unit to:

receive a first encoded data share of the set of encoded data shares;

encode the first encoded data share using a second threshold based secret sharing scheme in accordance with second secret sharing parameters to produce a first set of encoded data sub-shares, wherein the first secret sharing parameters differ from the second secret sharing parameters; and store the first set of encoded data sub-shares in a set of memory devices of the first storage unit, wherein a threshold number of encoded data sub-shares of the first set of encoded data sub-shares is decodable to recover the first encoded data share.

12. The computer readable storage device of claim 11 further comprises:

a third storage section further stores operational instructions that, when executed by the first storage unit, causes the first storage unit to:

receive a read request for the first encoded data share from a requesting device;

rebuild the first encoded data share from at least the threshold number of encoded data sub-shares of the first set of encoded data sub-shares; and send the rebuilt first encoded data share to the requesting device.

13. The computer readable storage device of claim 11 further comprises:

a third storage section further stores operational instructions that, when executed by a second storage unit of the set of storage units, causes the second storage unit to:

receive a second encoded data share of the set of encoded data shares;

encode the second encoded data share using a third threshold based secret sharing scheme in accordance with third secret sharing parameters to produce a second set of encoded data sub-shares; and store the second set of encoded data sub-shares in a set of memory devices of the second storage unit, wherein a threshold number of encoded data sub-shares of the second set of encoded data sub-shares is decodable to recover the second encoded data share.

14. The computer readable storage device of claim 13, wherein the threshold number of encoded data sub-shares of the first set of encoded data sub-shares differs from the threshold number of encoded data sub-shares of the second set of encoded data sub-shares.

15. The computer readable storage device of claim 11, wherein the first threshold based secret sharing scheme and the second threshold based secret sharing scheme utilize a common threshold based secret sharing function.

16. The computer readable storage device of claim 11, wherein the first threshold based secret sharing scheme and the second threshold based secret sharing scheme utilize differing threshold based secret sharing functions.

17. The computer readable storage device of claim 11, where the first storage section further stores operational instructions that, when executed by the computing device, cause the computing device to:
    determine the first secret sharing parameters based on one or more of a number of storage units of the set of storage units, a sub-sharing capability of one or more storage units of the set of storage units, or a reliability level of one or more storage units of the set of storage units.

18. The computer readable storage device of claim 11, where the second storage section further stores operational instructions that, when executed by the first storage unit, causes the first storage to:
    determine the second secret sharing parameters based on one or more of a number of memory devices of the first storage unit, a reliability level of memory devices of the first storage unit, an available capacity level of memory devices of the memory devices of the first storage unit, or random selection.

19. The computer readable storage device of claim 11, wherein the first threshold based secret sharing scheme is an all-or-nothing transform with Reed Solomon coding (AONT-RS) secret sharing scheme.

20. The computer readable storage device of claim 11, wherein the first threshold based secret sharing scheme and the second threshold based secret sharing scheme are differing schemes from the group including an all-or-nothing transform with Reed Solomon coding (AONT-RS) secret sharing function, a Shamir secret sharing function, a Blakley secret sharing function, and a Rabin information dispersal algorithm (IDA) secret sharing function.

* * * * *